March 28, 1939.  G. W. JACOBSON  2,151,919
LOCKING DEVICE
Filed March 25, 1935

Inventor:-
Gunnard W. Jacobson
By: Cox & Moore attys.

Patented Mar. 28, 1939

2,151,919

UNITED STATES PATENT OFFICE 2,151,919

LOCKING DEVICE

Gunnard W. Jacobson, Chicago, Ill., assignor to Illinois Tool Works, Chicago, Ill., a corporation of Illinois Application March 25, 1935, Serial No. 12,779

3 Claims. (Cl. 151—37)

My invention relates generally to locking devices, and particularly to a clamping member and lock washer assembly.

It is one of the important objects of my invention to provide a clamping member and lock washer assembly wherein a pronged washer of the internal tooth type may be conveniently retained in an operative position upon a clamping member, such as a screw head or nut, and to this end I propose to configurate a peripheral portion of the clamping member in a manner to effectively provide a lock washer retaining structure.

More specifically, my invention contemplates the provision of a clamping member which is not only adapted to permit an internally pronged lock washer to be yieldably retained in position thereon, but also to permit relative rotative movement between the washer and nut during the clamping operation.

Still more specifically, my invention contemplates lock washers of the type mentioned above equipped with laterally extending gripping elements which are adapted to resiliently bear against the peripheral structure of the clamping member, and at the same time permit relative rotation between the washer and nut during the clamping operation.

The foregoing and numerous other objects and advantages will be more apparent from the following detailed description when considered in connection with the accompanying drawing, wherein—

Figure 5:
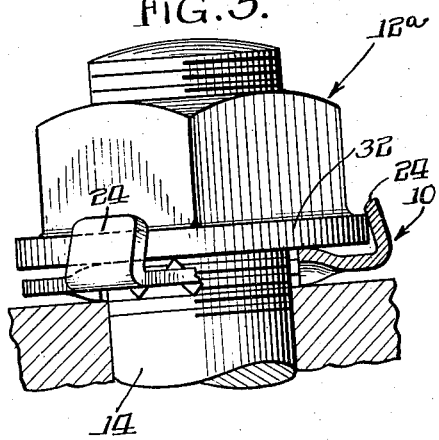
Figure 6:
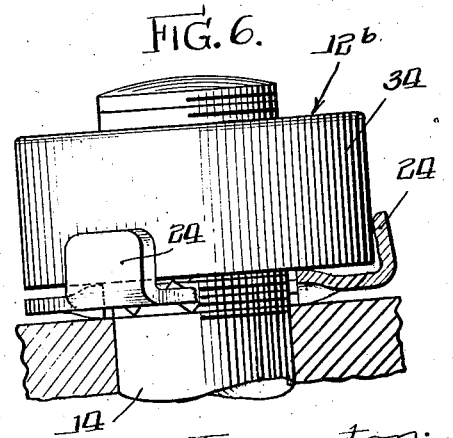

Figure 5 illustrates a modified nut and washer assembly whereby the nut or clamping member is provided with an annular structure which cooperates with the gripping elements of the washer in maintaining said parts together as an operative unit; and Figure 6 discloses a still further modification wherein the threaded clamping member is provided with a cylindrical surface against the outer peripheral surface of which the gripping elements of the washer are adapted to bear, the cylindrical outer surface of the clamping member serving to render the parts relatively rotatable as the assembly is being tightened against a work piece. In both Figures 5 and 6 a portion of the washer is broken away to more clearly illustrate the manner in which the gripping elements cooperate with the peripheral surface of the clamping member.

Figure 1:
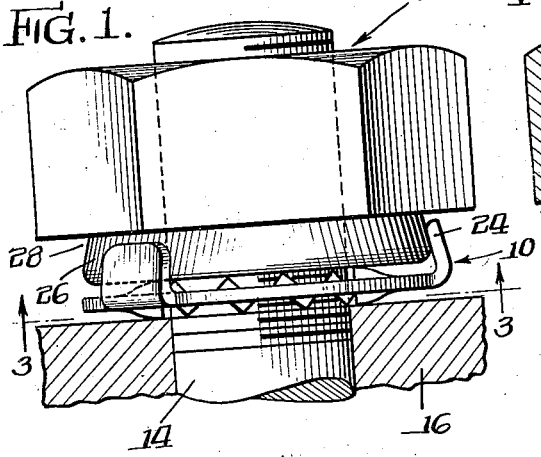
Figure 1 is a side elevational view of a nut and washer assembly which is representative of one embodiment of my invention.

Referring now to the drawing more in detail wherein like numerals have been used to designate similar parts throughout the various figures, it will be noted that Figure 1, illustrating one embodiment of my invention, includes a lock washer 10 coupled with a rotary clamping member or nut 12. The nut 12 is threaded to receive a screw or bolt 14, and by rotating the nut in a clockwise direction, as viewed from above, said nut and washer assembly may be tightened against the surface of a work piece 16.

Figure 2:
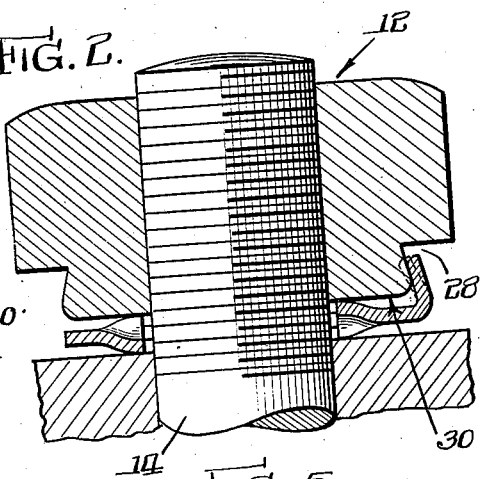
Figure 2 is a central vertical sectional view taken substantially along the line 2—2 of Figure 3.
Figure 3:
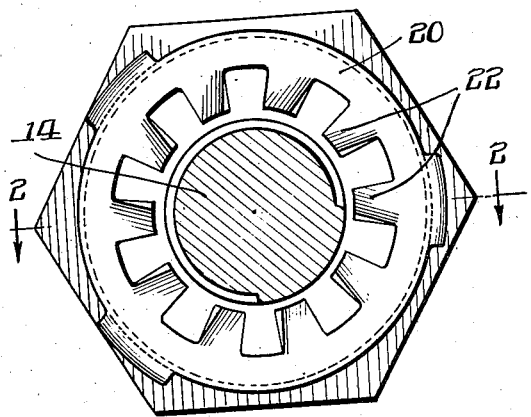
Figure 3 is a horizontal sectional view of the underside of the assembly shown in Figure 1, said view being taken substantially along the line 3—3 of Figure 1.
Figure 4:
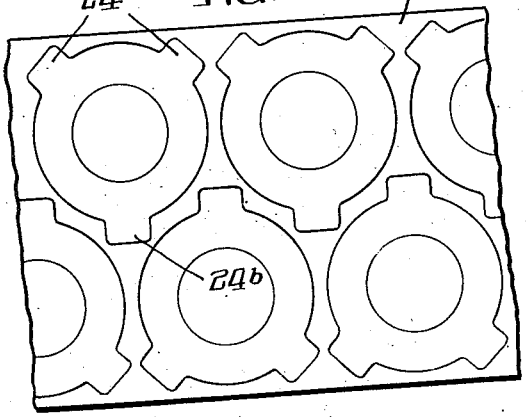
Figure 4 illustrates the manner in which the washer may be economically stamped from flat spring stock.

The washer 10 is preferably stamped, or otherwise formed, from flat spring stock—for example, the strip stock 18 shown in Figure 4. The washer includes an annular body portion 20 and a plurality of internal marginal prongs 22 which are warped or bent in such a manner as to present oppositely disposed work engaging edges or corners. Extending laterally of and formed integral with the annular body 20 are a plurality of gripping elements 24 designed to impinge or yieldingly grip a complementary peripheral surface 26 of the nut 12. In Figures 1 to 3, inclusive, this surface 26 is slightly inclined with respect to the axis of the clamping member or nut 12 and is formed by providing a radially exposed annular opening 28. The portion of the nut stock bounded by the peripheral surface 26 has a clamping surface 30 which is adapted to bear against and lockingly engage the washer prongs 22 when the nut is tightened upon the screw or bolt 14. The gripping elements 24 when detached from the nut 12 occupy the dotted position indicated in Figure 2. Thus, after the washer has been urged into its normal operating position, the elements 24 are sprung outwardly as a result of the impingement thereof with the surface 26, and in this manner said gripping elements yieldingly bear against and thus frictionally engage the surface 26. The frictional resistance thus set up is sufficient to positively prevent inadvertent axial displacement of the clamping member and washer, but will permit relative rotation between said parts when the nut causes the washer prongs 22 to engage the work piece 16. In other words, after the assembly comprising the nut and washer has been shifted into operative engagement with the work, the edges of the prongs on one side of the washer will lockingly engage the work and set up sufficient resistance to prevent rotation of the washer with respect to the work. The nut or clamping member is then free to complete its rotary clamping movement. This continued clamping movement of the nut places the washer prongs 22 under tension, and thereby establishes an effective interlock between the work and the nut.

I have been able to reduce waste of material in the strip stock 18 by circumferentially disposing the gripping elements 24 about the body 20 in the manner indicated in Figure 4. It will be seen that two of the gripping elements, which I have indicated by the numeral 24a in Figure 4, are spaced closer to each other than they are to the element I have designated as 24b. If the elements were equally spaced about the body and then stamped from the strip stock 18, a considerable increase in waste material would be experienced. By having the unequal circumferential spacing of the gripping elements, as just described, scrap is reduced to a minimum.

In Figure 5 I have shown a modified assembly wherein the washer 10 is identical in structure with the washer just described. A nut 12a is shown which is provided with an annular flange 32. The gripping elements 24 resiliently grip or bear against the flange 32 in the same manner as they impinge the peripheral surface 26 shown in Figures 1 to 3, inclusive. As the assembly is being clamped against the work, the frictional resistance set up between the gripping elements 24 and the flange 32 is overcome to the extent that relative rotative movement will take place between the clamping member and washer.

In Figure 6 a still further modification is disclosed wherein the clamping member or nut designated by the numeral 12b has a cylindrical peripheral surface 34. The gripping elements 24 impinge the peripheral surface 34, and thus insure the clamping member and washer against inadvertent axial displacement. The nut 12b, like the nut 12a just described, need not be recessed to receive the washer 10, the gripping elements resiliently bearing against the exposed peripheral surfaces of said clamping members.

From the foregoing it will be apparent that my invention contemplates a simple and practical nut and washer assembly wherein the washer is maintained in operative position on the clamping member by resiliently gripping an exposed peripheral surface, the friction set up by the gripping action of the washer being insufficient to preclude relative rotation between the parts during the clamping operation. Obviously the invention is not limited to clamping members in the form of nuts disclosed herein, but is adaptable to screw heads and other types of threaded devices equipped with clamping surfaces. My improved lock washers equipped with the gripping elements can be produced from flat spring stock with a minimum amount of waste material, and this is of the greatest importance from the standpoint of economy in production. While the amount of waste stock or scrap for each washer in itself may seem small, in the aggregate the total cost for such waste becomes a vital factor.

Having thus described my invention, what I claim as new and desire to secure by Letters Patent is:

1. A locking device including a rotary clamping member having a clamping surface and an annular flange encircling the outer periphery of the clamping member, a lock washer formed of spring stock, said washer including an annular body portion and a plurality of internal marginal resilient prongs warped out of the plane of the body, and means extending axially of the washer body and yieldably bearing against the flange of said clamping member for securing the washer and clamping member together as a unit and permitting relative rotation between the washer and clamping member as said parts are tightened against a work piece, the prongs of said washer being operatively associated with the clamping surface of said rotary clamping member, the bounding planes of said annular body being perpendicular to the axis of the washer prior to the application of said washer to the work.

2. A locking device including a rotary clamping member having a clamping surface and an outer periphery comprising a single, curved, concentric, smooth surface encircling the clamping member, a lock washer formed of spring stock, said washer including an annular body portion and a plurality of internal, marginal, resilient prongs warped out of the smooth surface of the body, and means extending axially of the washer body and yieldably bearing against the said peripheral smooth surface of said clamping member for securing the washer and clamping member together as a unit and permitting relative rotation between the washer and clamping member as said parts are tightened against a work piece, the prongs of said washer being operatively associated with the clamping surface of said rotary clamping member, said prongs, annular body, and yieldable bearing means extending from said body being constructed and arranged whereby to prevent radial movement of the prongs when the washer is clamped against a work piece.

3. A locking device including a rotary threaded clamping member having a clamping surface and an outer periphery, said outer periphery comprising seat means located substantially concentrically about the axis of said rotary clamping member and adapted to provide an outer seating portion for interengagement with a laterally extending portion of a lock washer, and a lock washer, said washer including an annular body portion and a plurality of internal, resilient teeth projecting in opposite directions out of the plane of said body portion, said washer body being provided in the vicinity of its outer margin with flange means extending axially and adapted to engage said outer peripheral seat means of the clamping member for securing the lock washer and the clamping member together as a unit and permitting relative rotation between the lock washer and clamping member as the parts are tightened against a work piece, the resilient teeth of said washer being operatively associated with the clamping surface of said rotary clamping member, said teeth, annular body and said axially extending flange means being constructed and arranged whereby to retain the lock washer in a position substantially co-axial with the clamping member when the washer is tightened against a work piece.

GUNNARD W. JACOBSON.